(12) United States Patent (10) Patent No.: US 9,151,585 B2
Sanchez (45) Date of Patent: Oct. 6, 2015

(54) CABINET INSTALLATION TOOL AND SYSTEM OF USE THEREOF

(76) Inventor: John Scott Sanchez, Orlando, FL (US)

( * ) Notice: Subject to any disclaimer, the term of this patent is extended or adjusted under 35 U.S.C. 154(b) by 951 days.

(21) Appl. No.: 13/267,835

(22) Filed: Oct. 6, 2011

(65) Prior Publication Data

US 2013/0086788 A1 Apr. 11, 2013

(51) Int. Cl.
*G01B 3/14* (2006.01)
*G01B 3/00* (2006.01)

(52) U.S. Cl.
CPC .. *G01B 3/00* (2013.01); *G01B 3/14* (2013.01); *Y10T 29/49778* (2015.01)

(58) Field of Classification Search
CPC ............................................ G01B 3/14
USPC .............. 33/194, 562, 563, 613, 645
See application file for complete search history.

(56) References Cited

U.S. PATENT DOCUMENTS

| | | | |
|---|---|---|---|
| 2,567,586 A * | 9/1951 | Werder | 33/562 |
| 3,239,936 A | 3/1966 | Hesse | |
| 3,985,168 A | 10/1976 | Lundquist | |
| 5,064,319 A | 11/1991 | Ericksen | |
| 5,456,015 A | 10/1995 | Butcher et al. | |
| 5,706,586 A * | 1/1998 | Payne | 33/563 |
| 5,713,135 A | 2/1998 | Acopulos | |
| 6,219,930 B1 * | 4/2001 | Reid | 33/562 |
| 6,272,758 B1 | 8/2001 | Wheeler | |
| 6,553,683 B1 * | 4/2003 | Klass et al. | 33/562 |
| 6,643,942 B1 | 11/2003 | Russell | |
| 6,810,598 B2 | 11/2004 | Boys | |
| 6,818,824 B1 * | 11/2004 | Marcou et al. | 33/645 |
| 6,895,683 B1 | 5/2005 | Olsen | |
| 7,373,731 B2 | 5/2008 | Nyberg | |
| 7,513,049 B2 | 4/2009 | Williams | |
| 8,393,088 B1 * | 3/2013 | Palisano | 33/562 |
| 2002/0038518 A1 | 4/2002 | Barrows | |
| 2003/0051359 A1 | 3/2003 | Connor | |
| 2004/0027038 A1 | 2/2004 | Gaesser et al. | |
| 2004/0163269 A1 * | 8/2004 | Brady | 33/562 |
| 2006/0265895 A1 * | 11/2006 | Daugherty | 33/613 |
| 2012/0096724 A1 * | 4/2012 | Eyermann et al. | 33/354 |
| 2012/0227275 A1 * | 9/2012 | Goldrick et al. | 33/562 |
| 2013/0180119 A1 * | 7/2013 | Prince | 33/645 |
| 2013/0255056 A1 * | 10/2013 | Atherton et al. | 33/562 |

OTHER PUBLICATIONS

Measure Pro, Installation Templates for Cabinet Hardware, Jun. 16, 2011, http://www.measurepro.com/collections/all.

* cited by examiner

*Primary Examiner* — G. Bradley Bennett

(57) ABSTRACT

A template tool that is adapted to quickly and easily define standard cabinet front edge position, whether for base or wall cabinet, and whether from stud or drywall wall.

16 Claims, 19 Drawing Sheets

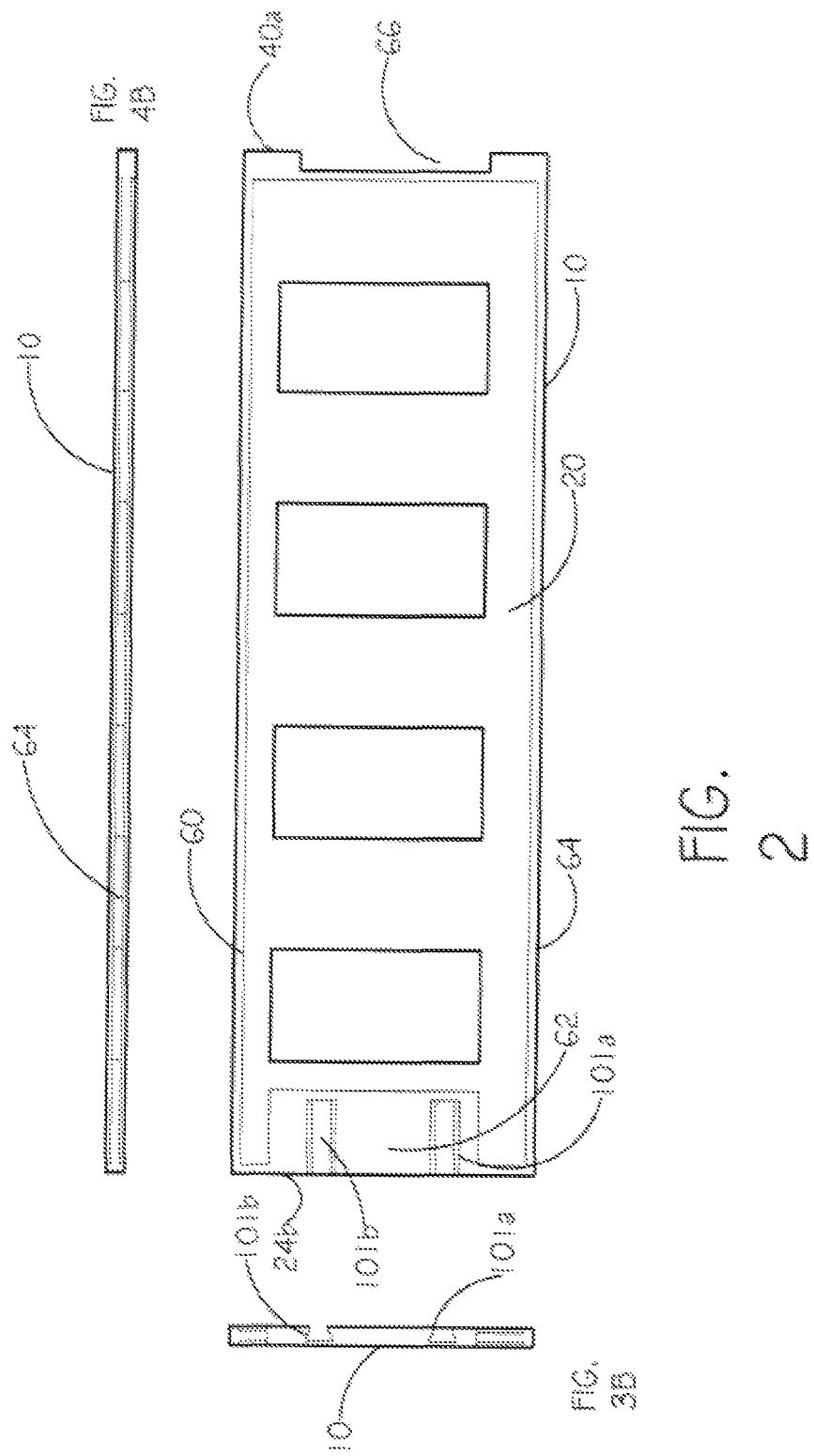

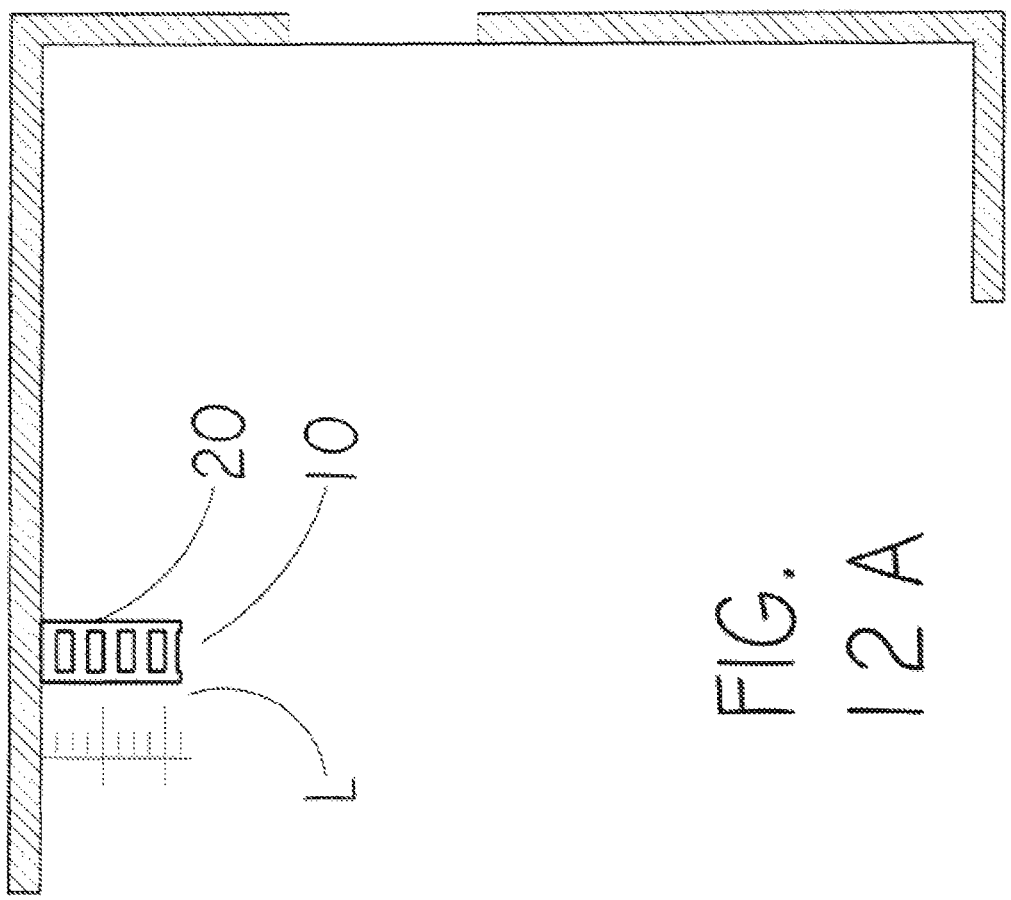

12C

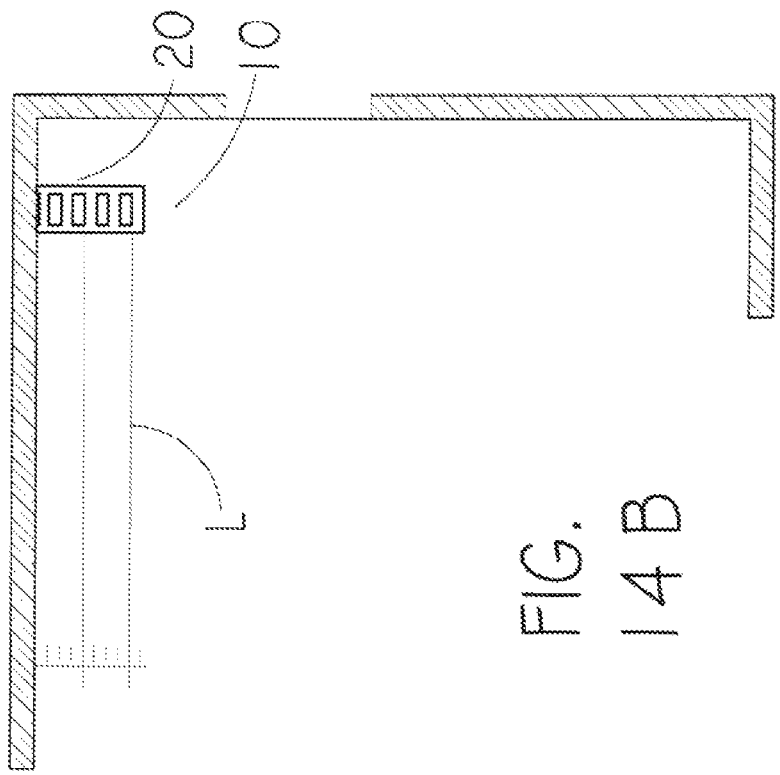
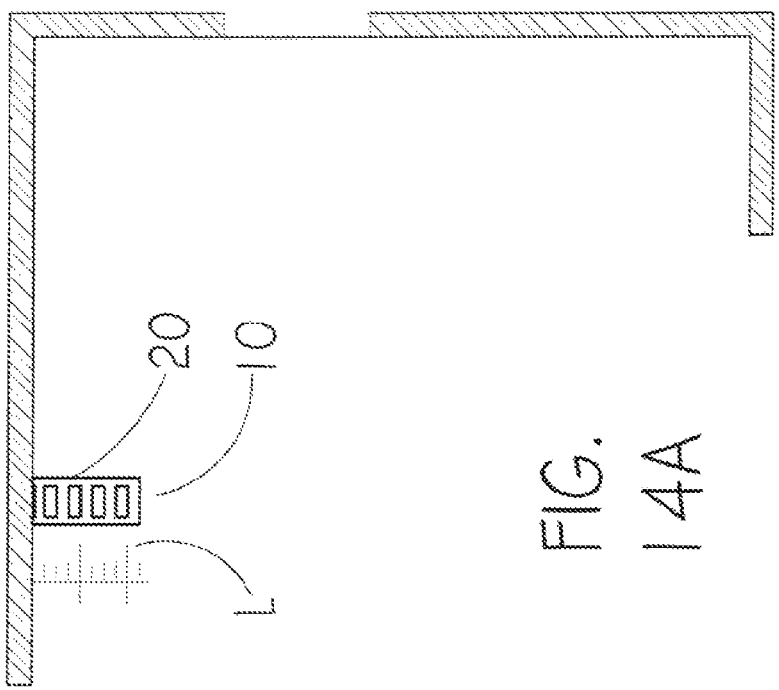
FIG. 14A
FIG. 14B

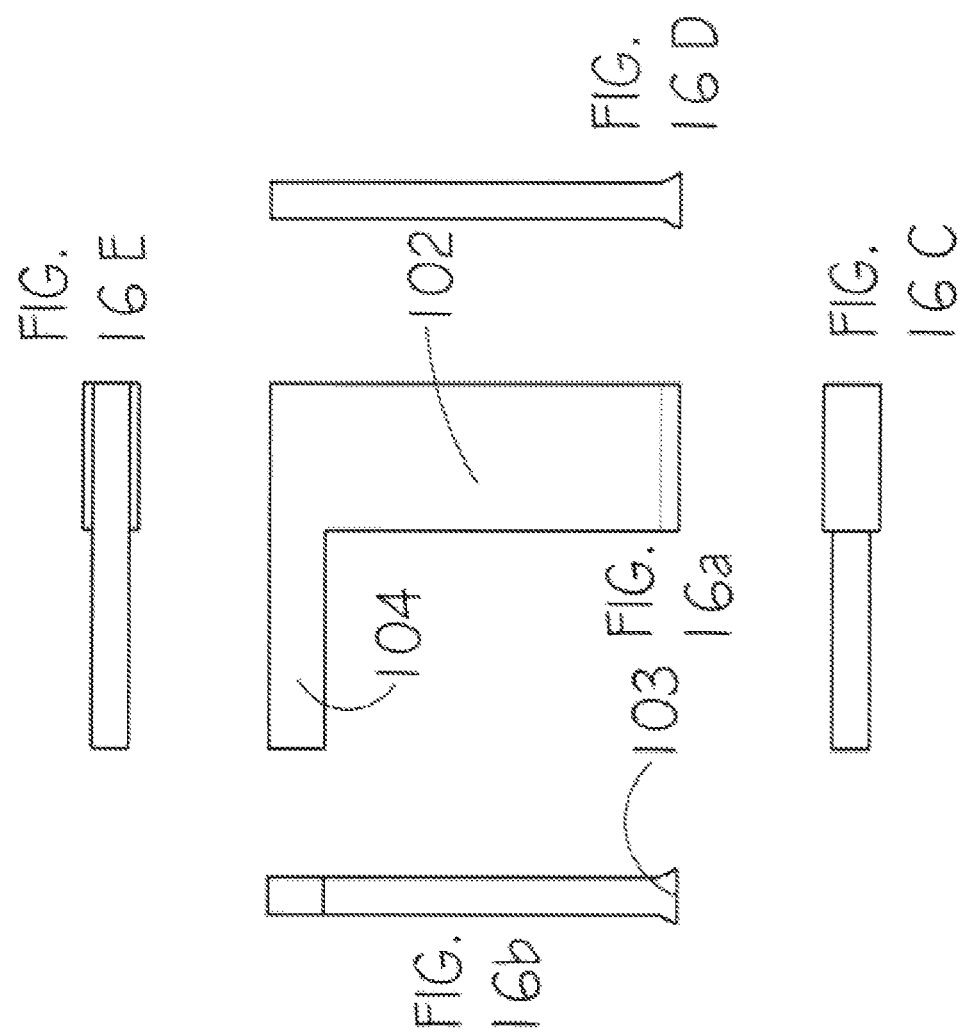

CABINET INSTALLATION TOOL AND SYSTEM OF USE THEREOF

FIELD

The present disclosure relates generally to templates, and more particularly, to a cabinet installation tool and system of use thereof.

BACKGROUND

It is not uncommon for the kitchen to be the functional center of a home, with children, family and friends regularly gathering therein, enjoying the warmth and aroma of the space. It is not surprising, then, that kitchen design is considered a critical element of any home. Cabinets are perhaps the most important feature in a kitchen, defining the ambiance while providing necessary storage space for cookware, servingware, glassware, and so many other daily necessities. Cabinet functionality is relied upon every day in most households, and if poor, can present daily challenges to the smallest tasks. It is well recognized that proper layout and placement of cabinets is critical to successful functionality.

Proper installation of cabinets thus necessarily begins with proper positioning. This is directly influenced from the very initial stages of kitchen design. That is, whether a new home or a remodel, the first step in layout design is space measurement. Typically, a designer or do-it-yourself homeowner measures, for example, by extending a measuring tape along the width of a window, the length from one window edge to a wall, and the length from the other window edge to an endpoint, such as a doorway or another wall. Such measurements, added together, typically then provide a starting point, with placement of the sink to be centered under the window, and cabinets and appliances extending outwardly therefrom. A similar measurement is developed for each wall to be part of the installation.

These measurements are relied upon in defining the available options for cabinet configurations that will fit into the space. Computer-aided design programs, for example, receive measurement input and offer suggested arrangements, fitting standard-sized cabinetry elements with standard-sized appliances into a functional flow, and predicting necessary "fill" spacers for seamless presentation of the finished room. It can be readily appreciated that an error in initial measurement can bring about devastating consequences. Costly cabinets are not readily suited for reconfiguration, and are not typically accepted for return.

At the time of installation, again, measurements are frequently gathered, again by measuring tape along a wall, with cabinet installation beginning at a selected, measured point, and continuing therefrom. Walls that are not plumb, as well as errors in measuring tape placement, reading, and calculating frequently result in unexpected situations, such as discovering a corner cabinet with a gap, or even worse, a corner cabinet that will not fit or an appliance opening that is too small to accommodate the appliance. Some solutions have been proposed as attempts to minimize or eliminate such issues, however none focus on the front edge of a cabinet and each is disadvantageous in view of the present disclosure.

Therefore, it is readily apparent that there is a need for a cabinet installation tool that enables accurate determination and marking of front edge dimensions, alleviating wall variation issues and providing consistent and error-free results, whether from drywall or studs.

BRIEF SUMMARY

Briefly described, in a preferred embodiment, the present device overcomes the above-mentioned disadvantages and meets the recognized need by providing a template tool that is adapted to quickly and easily define standard cabinet front edge position, whether for base or wall cabinet, and whether from stud or drywall wall.

According to its major aspects and broadly stated, in its preferred form, the present cabinet installation tool facilitates reproducibly accurate determination of the front edge dimensions for cabinet layout, whether for kitchen, bath, garage, closet or other cabinet locale, wherein the simple, error-proof method of use of the cabinet installation tool may be configured according to any dimensional standards or specifications of a cabinet line or genre.

More specifically, the device of the present disclosure in its preferred form is a cabinet installation tool comprising a generally rectangular outer frame with one set of long-length feet, one set of short-length feet, and a plurality of central apertures, wherein each outer frame edge is preferably a working surface, and wherein each central aperture is strategically positioned. There is, accordingly, an elongate work surface and a short work surface for use with drywall, and there is an elongate work surface and a short work surface for use with studs, wherein the stud work surfaces incorporate the "feet", as will be further described. The overall shape enables the unique functionality; however, the measurements of the features are particularly relevant according to the standardized application of use. Extenders may also be included in an embodiment, with wherein accommodation of an installed backsplash is facilitated.

In use, for determination of base cabinet placement, an appropriate short work surface (without or with feet) is placed against the drywall or stud reference proximate a selected position for the end base cabinet edge, and a line is drawn on the ground surface/foundation marking the end base cabinet edge and front edge. The tool is repositioned, and the marking is continued, until a line is visible and in position with the desired front edge of the intended cabinets. The defined front edge base cabinet line is measured, and that measurement provides an accurate point of reference for the determination of the layout landscape, or face, of the kitchen cabinet base. For determination of wall cabinet placement, the same series of simple and error-free markings is accomplished, but with an appropriate long work surface (without or with feet) placed against the drywall or stud reference. The defined front edge line for the wall cabinets is created, and measured, with no need for calculations and no risk of negative influence on installation from wall variation-induced measurements, but instead based upon a reproducible and meaningfully visible placement methodology.

Accordingly, a feature and advantage of the present device is its ability to facilitate quick and easy determination of cabinet front edge positioning.

Another feature and advantage of the present device is its ability to convert for drywall to stud use with a simple positional change.

Still another feature and advantage of the present device is its ability to allow for ease of use by do-it-yourself homeowners, without requiring specialized or skilled training, yet with consistent and reproducible results.

Yet another feature and advantage of the present device is its ability to accommodate for installed backsplash dimensions and therefore adapt for use in any remodel or new cabinet installation environment.

Still yet another feature and advantage of the present device is its ability for easy, one-handed transport and use.

Yet still another feature and advantage of the present device is its ability to be utilized for kitchen cabinets, or for bath, garage, closet, or any other type cabinets, including in commercial settings, upon accomplishment of simple dimensional reconfigurations to accommodate standard cabinet sizes.

These and other features and advantages of the invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Alternate Embodiments with reference to the accompanying drawing figures, in which like reference numerals denote similar structure and refer to like elements throughout, and in which:

FIG. 2 is a bottom view of the cabinet installation tool of FIG. 1;

FIG. 3A is a short length end view of a stud work surface of the cabinet installation tool of FIG. 1;

FIG. 3B is a short length end view of a drywall work surface of the cabinet installation tool of FIG. 1;

FIG. 4A is a long length side view of a drywall work surface of the cabinet installation tool of FIG. 1;

FIG. 4B is a long length side view of a stud work surface of the cabinet installation tool of FIG. 1;

FIG. 12A is an overhead view of one step of a multi-step demonstration of a cabinet installation tool in use for planning wall and base cabinet installation relative to drywall;

FIG. 12C is an overhead view of another step of the multi-step demonstration of FIG. 12A;

FIG. 14A is an overhead view of one step of a multi-step demonstration of a cabinet installation tool in use for planning base and wall cabinet installation relative to stud wall;

FIG. 14B is an overhead view of another step of the multi-step demonstration of FIG. 14A, proximate a corner;

FIG. 16A is a side view of a stand-off element, according to an embodiment of the present disclosure;

FIG. 16B is a front view of the stand-off element of FIG. 16A;

FIG. 16C is a bottom view of the stand-off element of FIG. 16A;

FIG. 16D is a rear view of the stand-off element of FIG. 16A; and

FIG. 16E is a front view of the stand-off element of FIG. 16A.

DETAILED DESCRIPTION OF THE PREFERRED AND ALTERNATE EMBODIMENTS

Figure 1:
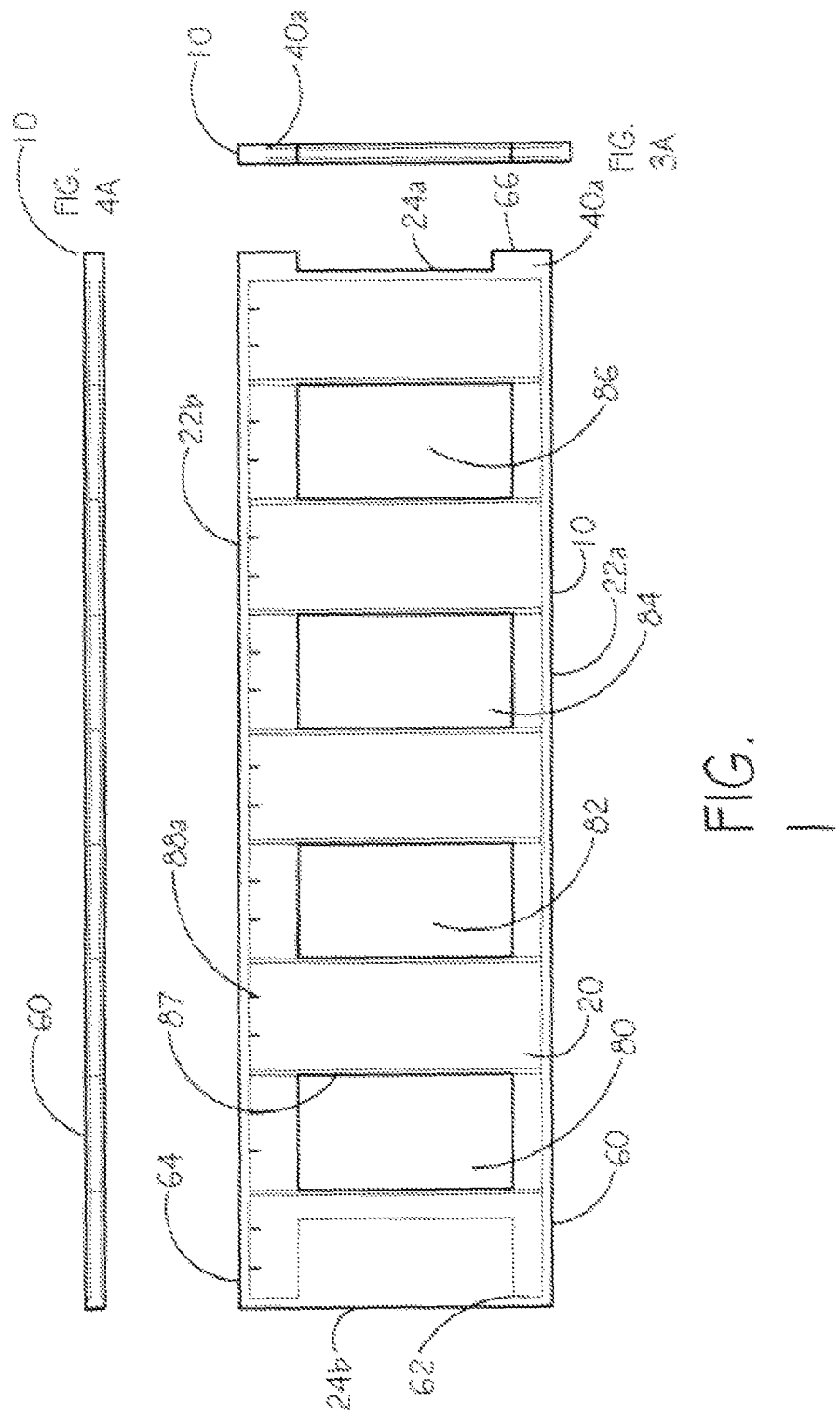
FIG. 1 is a top view of a cabinet installation tool, according to a preferred embodiment of the present device.

In describing the preferred and alternate embodiments of the present device, as illustrated in the figures and/or described herein, specific terminology is employed for the sake of clarity. The device, however, is not intended to be limited to the specific terminology so selected, and it is to be understood that each specific element includes all technical equivalents that operate in a similar manner to accomplish similar functions.

Referring now to FIGS. 1-4B, cabinet installation tool 10 preferably comprises frame 20, wherein frame 20 is preferably generally rectangularly-shaped, with first set of feet 40a along first short length 22a. The preferred shape defines short drywall work surface 62 and short stud work surface 66, wherein short stud work surface 66 is defined by first short length 24a and first set of feet 40a. Similarly, short drywall work surface 62 is defined by second short length 24b. It should be noted that it is this overall preferred shape that enables the efficient and reproducible functionality of cabinet installation tool 10, but the actual measurements of the features are particularly relevant according to the standardized application of use.

In the United States, new kitchen cabinets are generally standardized in three inch (3 in.) variations. The preferred embodiment of cabinet installation tool 10, as disclosed, is tailored toward U.S. standardized cabinets. It is in intended, however, that within the scope of the present disclosure, alternate embodiments could be constructed with dimensional alterations to accommodate differing standards and/or systems of measurement. For example, bath cabinets may be available in different standardized variations than kitchen cabinets; similarly, cabinets of all sorts from non-U.S. regions may be premised upon original standards. It is specifically recognized that cabinet installation tool 10 may be altered from the measurements disclosed herein as preferred and exemplary in order to accommodate and perform relative to these alternative standards.

With respect to the preferred embodiment, it is preferred that frame 20 and first set of feet 40a are integrally formed, with an overall preferred length for elongate surface 60 and elongate surface 64 of twenty four inches (24 in.). Overall preferred width for cabinet installation tool 10, and hence for short drywall work surface 62 and short stud work surface 66, is eight inches (8 in.). This preferred dimensional configuration is targeted toward the typical twenty four inch (24 in.) depth for base cabinets, with plurality of apertures 80, 82, 84, and 86 targeted toward the typical twelve inch (12 in.) depth for wall cabinets, as will be described more fully.

Figure 14C:
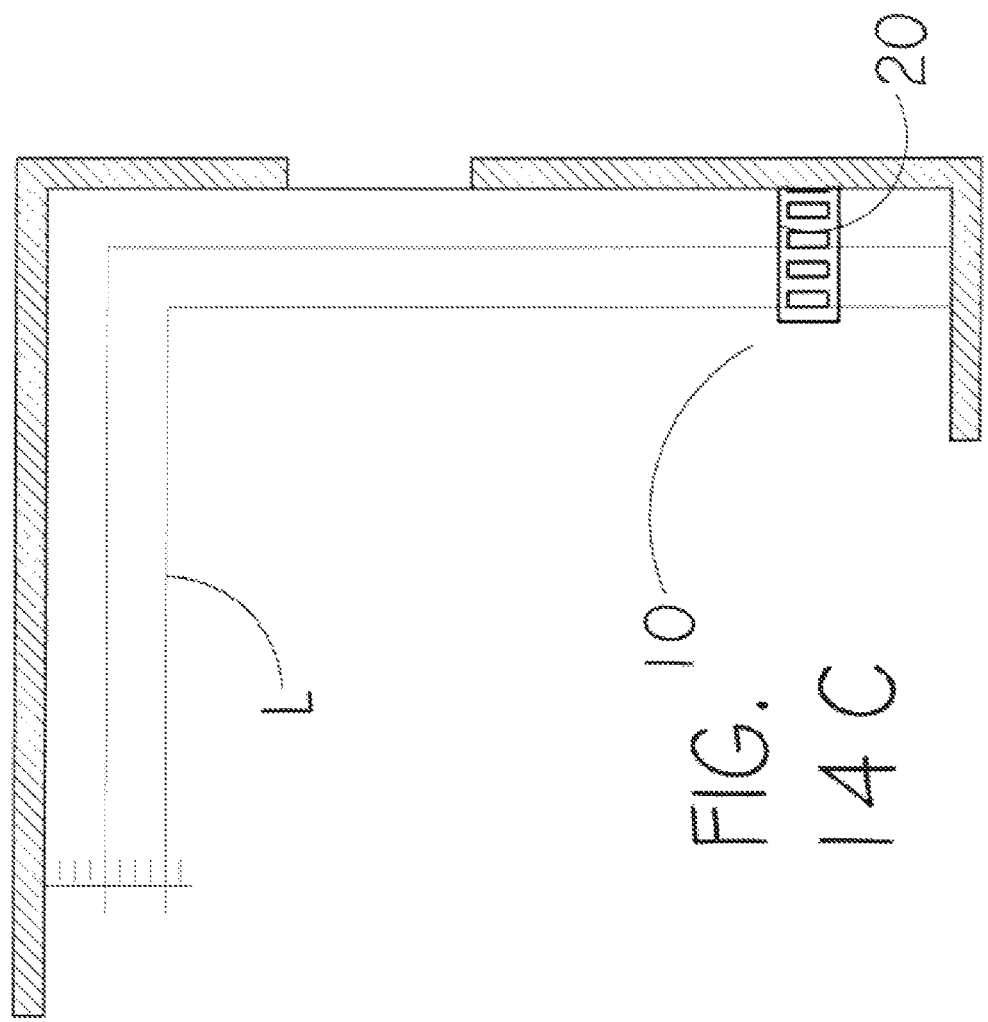
FIG. 14C is an overhead view of another step of the multi-step demonstration of FIG. 14A.

As may be observed in FIGS. 1 and 2, it is preferably first pair of feet 40a that contributes the one-half inch (0.5 in.) increment to each length measure for cabinet installation tool 10. This compensates for the subsequent addition of drywall when installation measurements are collected from a stud wall, such as representatively demonstrated in FIGS. 14A-

14C and 15. Alternately, as representatively demonstrated in FIGS. 12A-12C and 13, short drywall work surface 62 may be utilized, wherein no one-half inch increment is necessary.

According to the preferred embodiment, plurality of apertures 80, 82, 84, and 86 are defined within frame 20, wherein each aperture 80, 82, 84, and 86 is preferably generally rectangularly-shaped, preferably defined parallel with first and second short lengths 24a and 24b, and preferably defined perpendicular with first and second elongate lengths 22a and 22b. It should be recognized that alternate embodiments could be formed with more or fewer apertures, or with alternately shaped apertures; however, in such embodiments, preferred functionality for cabinet installation tool 10 would be impacted because plurality of apertures 80, 82, 84, and 86 function as templates and/or stencils for cabinet placement. In the preferred embodiment, each aperture 80, 82, 84, and 86 is three inches (3 in.) wide and nine inches (9 in.) long, wherein aperture 82 efficiently functions to mark the standard front edge placement of a wall cabinet as referenced above.

Accordingly, aperture 80 preferably extends from three to six inches (3 to 6 in.) from short drywall work surface 62; aperture 82 preferably extends from nine to twelve inches (9 to 12 in.) from short drywall work surface 62; aperture 84 preferably extends from fifteen to eighteen inches (15 to 18 in.) from short drywall work surface 62; and aperture 86 preferably extends from twenty one to twenty four inches (21 to 24 in.) from short drywall work surface 62. By such arrangement, a line may be quickly and easily traced onto the floor/ground surface by selection of any one of plurality of aperture edges 87 relating to the dimension of the intended cabinet, or countertop overhang, for example. In the preferred embodiment, each aperture edge 87 is identifiably marked on frame 20 with corresponding measurement indicator 88a for "no fail" reference during use relative to drywall. Similarly, for measurements relative to a stud wall, aperture 86 preferably extends from three and one half to six and one half inches (3.5 to 6.5 in.) from short stud work surface 66; aperture 84 preferably extends from nine and one half to twelve and one half inches (9.5 to 12.5 in.) from short stud work surface 66; aperture 82 preferably extends from fifteen and one half to eighteen and one half inches (15.5 to 18.5 in.) from short stud work surface 66; and aperture 80 preferably extends from twenty one and one half to twenty four and one half inches (21.5 to 24.5 in.) from short stud work surface 66, also with plurality of corresponding measurement indicators 88, but for use relative to studs.

Additional preferred dimensions for cabinet installation tool 10 also serve functional purpose. Each foot 41 is preferably one and one half inches (1.5 in.)

and the overall thickness of cabinet installation tool 10, as may be observed in FIGS. 3A, 3B, 4A, and 4B, is preferably one half inch (0.5 in.). These known and commonly used dimensions may be utilized by a worker/installer in any instance where such a measurement need be accomplished or marked, such as for a selected overhang or for a half inch set-away from a window ledge or the like.

Cabinet installation tool 10 is preferably formed from sturdy, yet lightweight materials, such as molded plastic or similar man made or natural material, preferably marked with measurement tick marks for easy reference. It should be understood by one skilled in the art that other materials or combinations thereof could be utilized, such as metal, wood, coated foam, composite, or any suitable material, without limitation, with suitable strength and durability, yet light enough for convenient transport. In one embodiment, cabinet installation device 10 could be constructed for disposability, such as with single use materials with minimal durability. Such an embodiment could be suitable for distribution to do-it-yourselfers, for example, as an aid for planning a remodel, wherein only a single job would be the focused intention of use. Cabinet installation tool 10 could be imprinted or otherwise marked with a "reduction to scale" chart, providing quick confirmation of cabinet centers to allow for targeted appliance positioning or the like, and/or could be marked with third-party advertisements and/or could bear a trademark of a professional installer, for example, functioning as a marketing and/or advertising revenue tool.

Also according to the preferred embodiment, and as depicted in FIGS. 2 and 3B, cabinet installation tool 10 is preferably equipped with recess channels 101a and 101b, preferably opposingly positioned relative to feet 41. It should be understood that these recess channels 101a and 101b are not required, although preferred, wherein cabinet installation tool 10 could be formed therewithout and still retain functionality, albeit without availability of stand-off elements 100. Preferred inclusion of recess channels 101a and 101b, however, enables selective utilization of stand-off elements 100, as described below.

Figure 5:
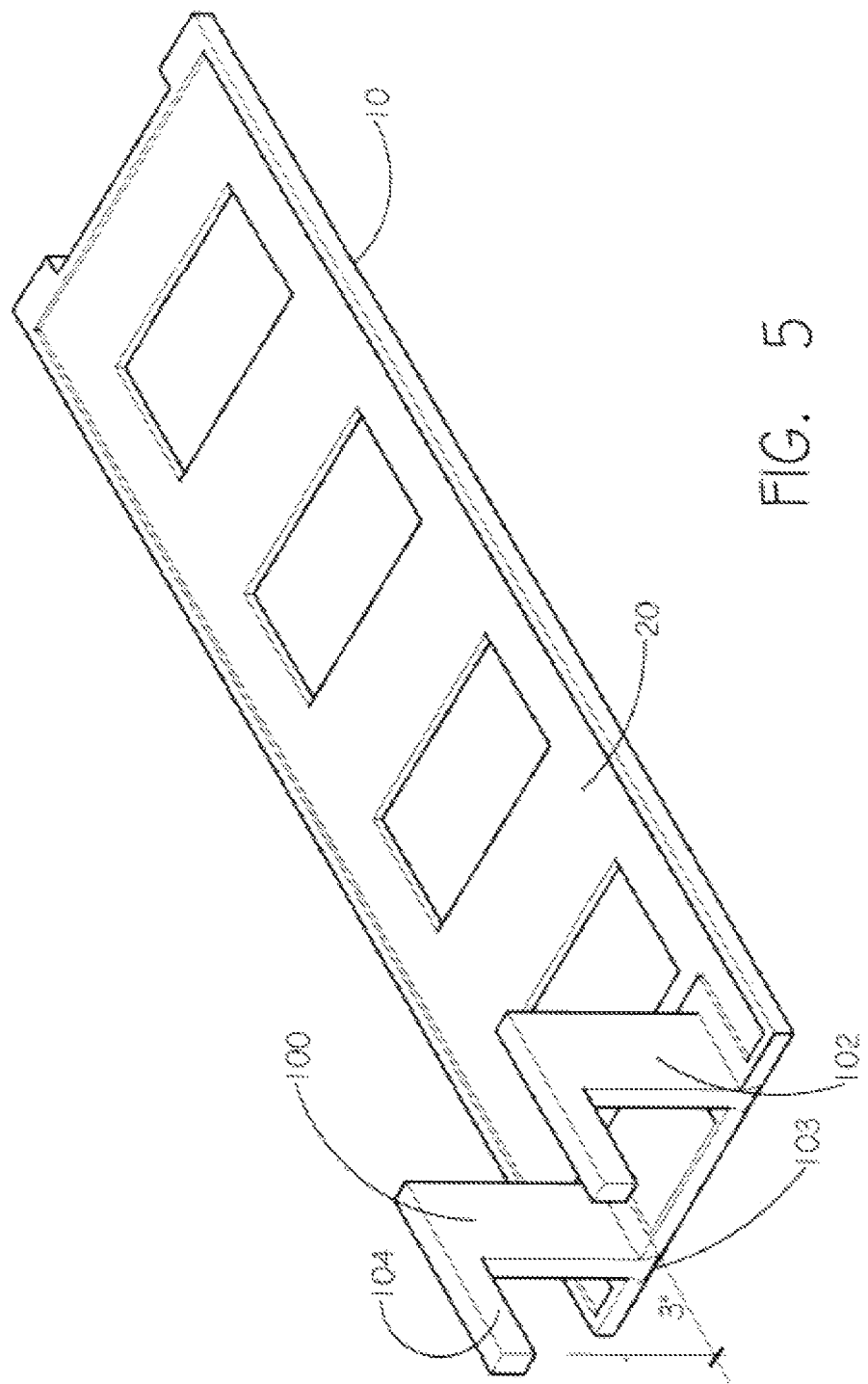
FIG. 5 is a top perspective view of the cabinet installation tool of FIG. 1, showing an optional stand-off element installed.
Figure 6:
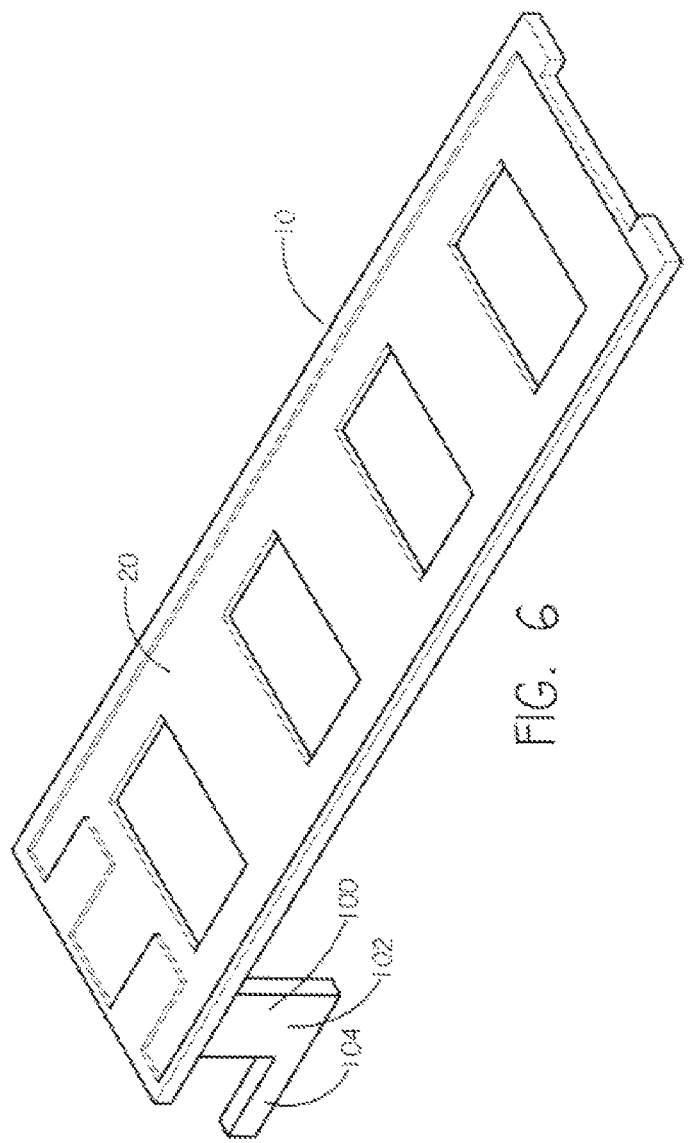
FIG. 6 is a bottom perspective view of the cabinet installation tool of FIG. 5.

In another alternate embodiment, stand-off elements 100 may be installed, as representatively depicted in FIGS. 5 and 6, wherein each stand-off element 100 functions to position cabinet installation tool 10 a pre-selected distance from an existing backsplash, such as in a remodel, in order to facilitate accurate determination of the front edge installation line in such a scenario. With reference to FIGS. 16A-16D, each stand-off element 100 is defined by support 102 and planar stand-off member 104, wherein it is the extended length of planar stand-off member 104 relative to frame 20 that enables accommodation of an existing back splash. Support base 103 is shaped to enable slidable positioning within recess channels 101a, 101b.

Figure 7:
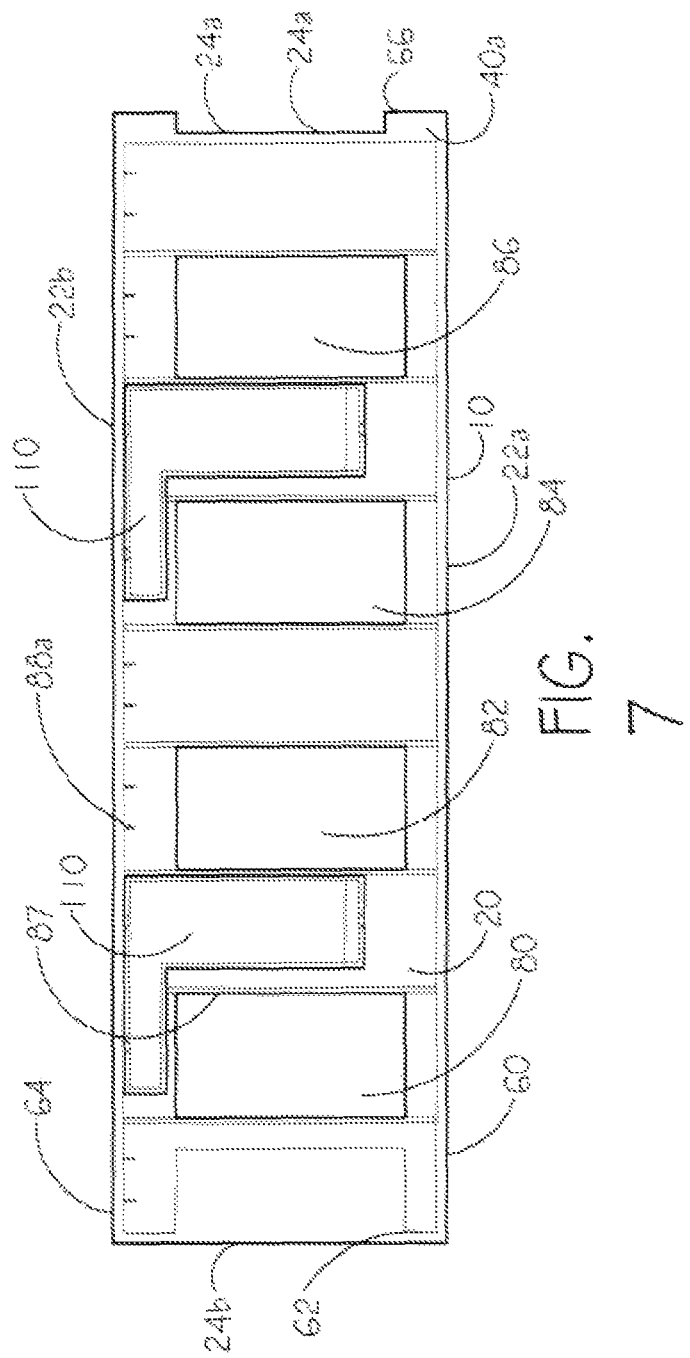
FIG. 7 is a perspective view of a cabinet installation tool, according to an alternate embodiment of the present disclosure.

Also, referring now to FIG. 7, cabinet installation tool 10 could comprise second set of feet 40b along first elongate length 22a, and could have a width of twelve inches (12 in.). This shape would define elongate drywall work surface 60 and elongate stud work surface 64, wherein elongate stud work surface 64 is defined by first elongate length 22a and with second set of feet 40b. Similarly, elongate drywall work surface 60 is defined by second elongate length 22b. It should be noted that it is this overall preferred shape that enables the efficient and reproducible functionality of cabinet installation tool 10, with ninety degree movement between placements of device 10, marking wall cabinets from one orientation and marking base cabinets from another orientation.

With respect to one embodiment, frame 20 and first and second sets of feet 40a and 40b could be integrally formed, with an overall length for elongate drywall work surface 60 and elongate stud work surface 64 of twenty four inches (24 in.). Overall width for cabinet installation tool 10, and hence for short drywall work surface 62 and short stud work surface 66, could be twelve inches (12 in.) in this alternate embodiment. This dimensional configuration is targeted toward the typical twenty four inch (24 in.) depth for base cabinets and the typical twelve inch (12 in.) depth for wall cabinets.

Figure 8:
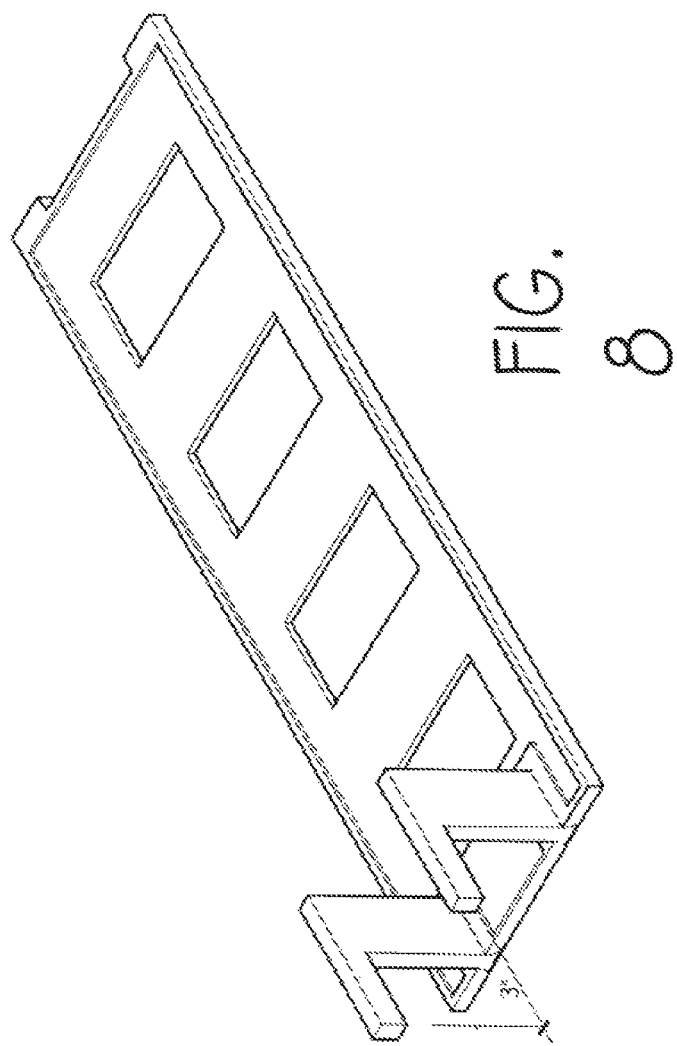
FIG. 8 is a perspective view of the cabinet installation tool of FIG. 7, showing the tool in use proximate a backsplash.
Figure 9:
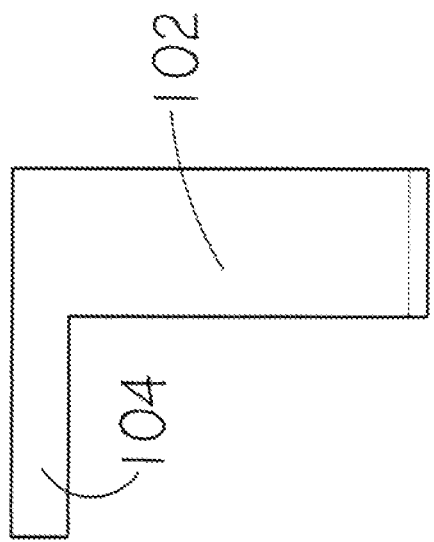
FIG. 9 is a perspective view of an extension stand-off element of the cabinet installation tool of FIG. 7.
Figure 10A:
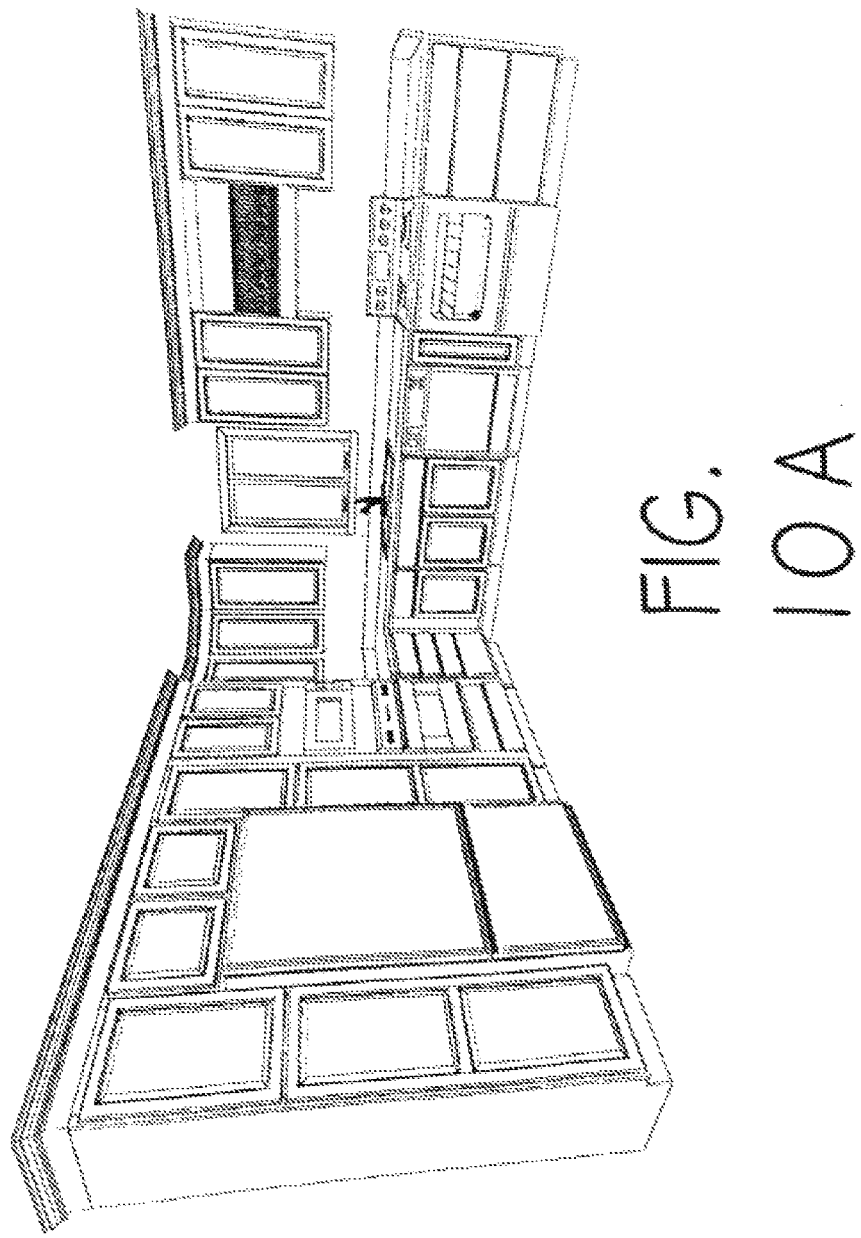
FIG. 10A is a perspective view of a multi-wall kitchen K1, showing an exemplary installation landscape.
Figure 10B:
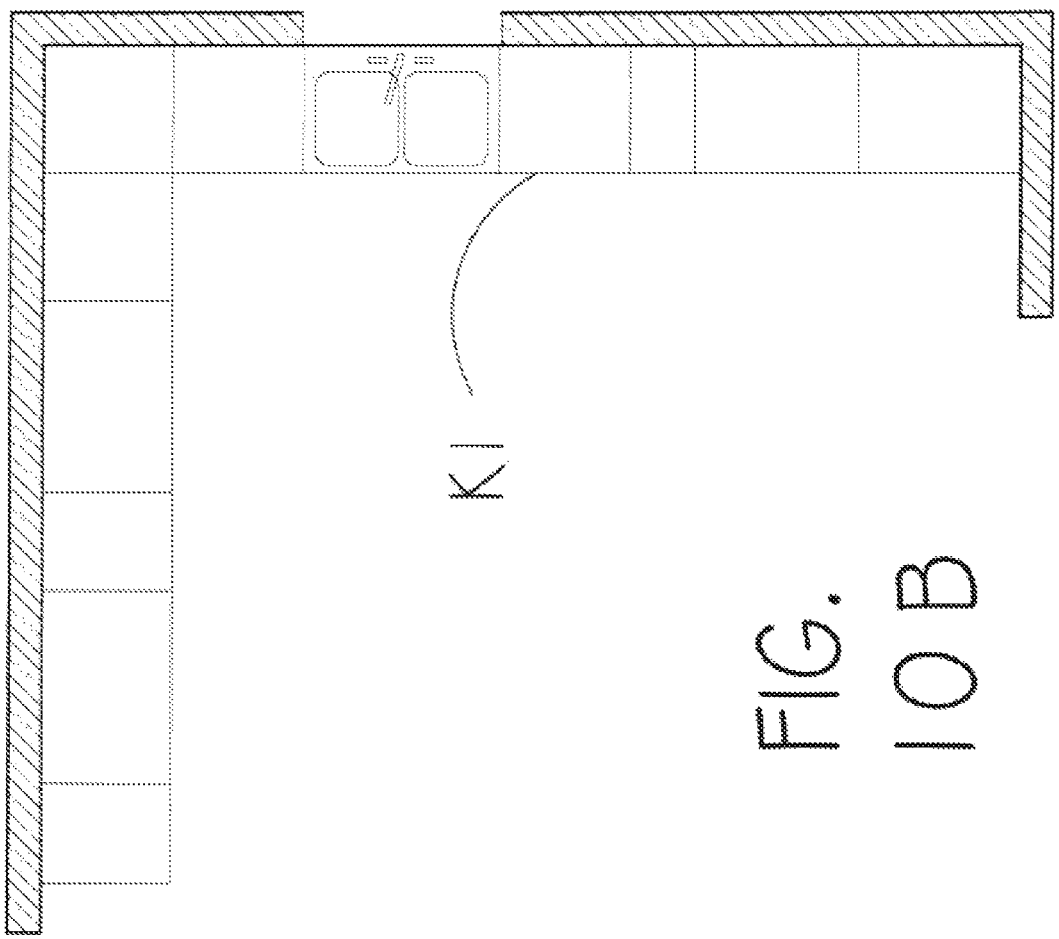
FIG. 10B is an overhead view of the multi-wall kitchen of FIG. 10A.
Figure 11A:
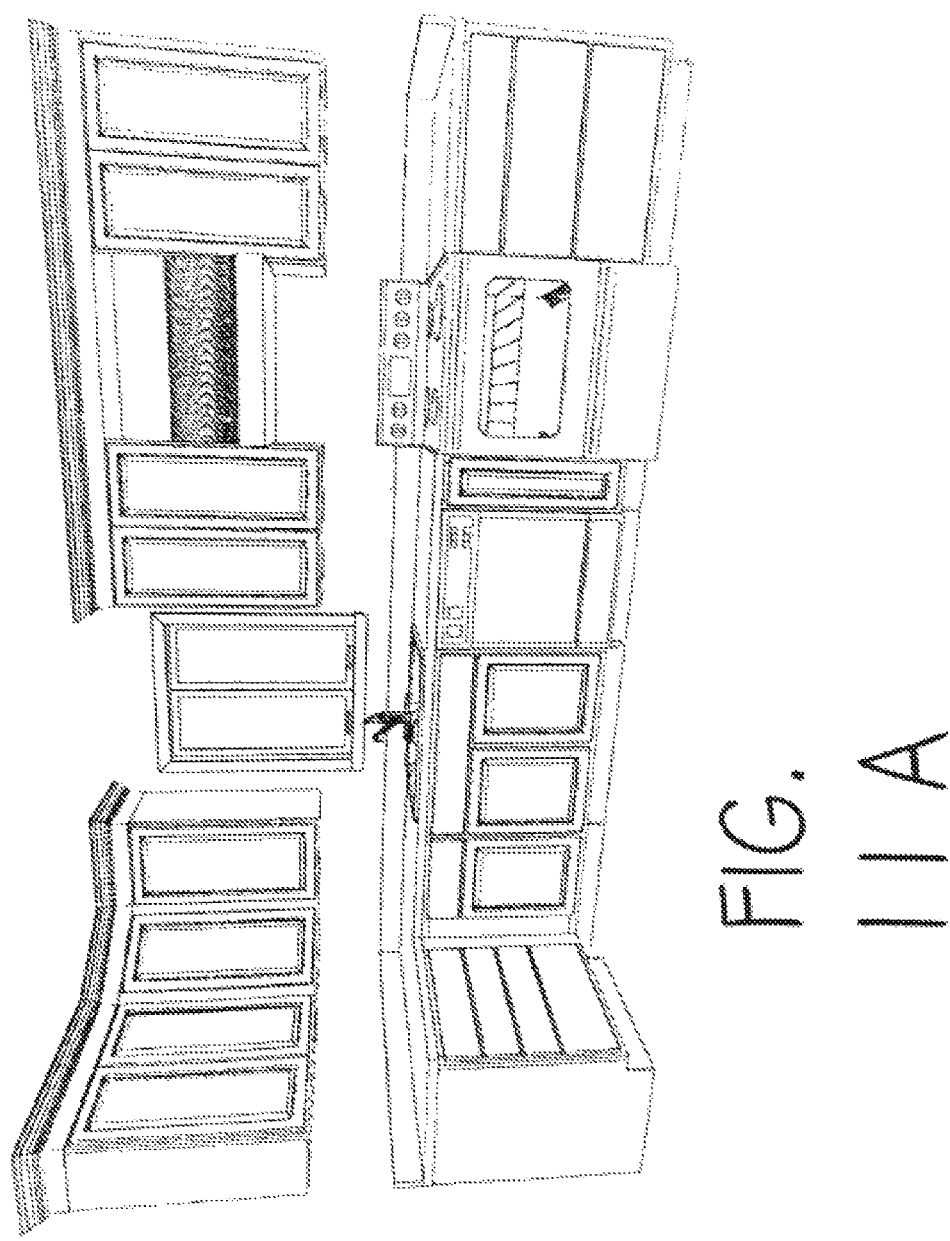
FIG. 11A is a perspective view of a single wall kitchen K2, showing an exemplary installation landscape.
Figure 11B:
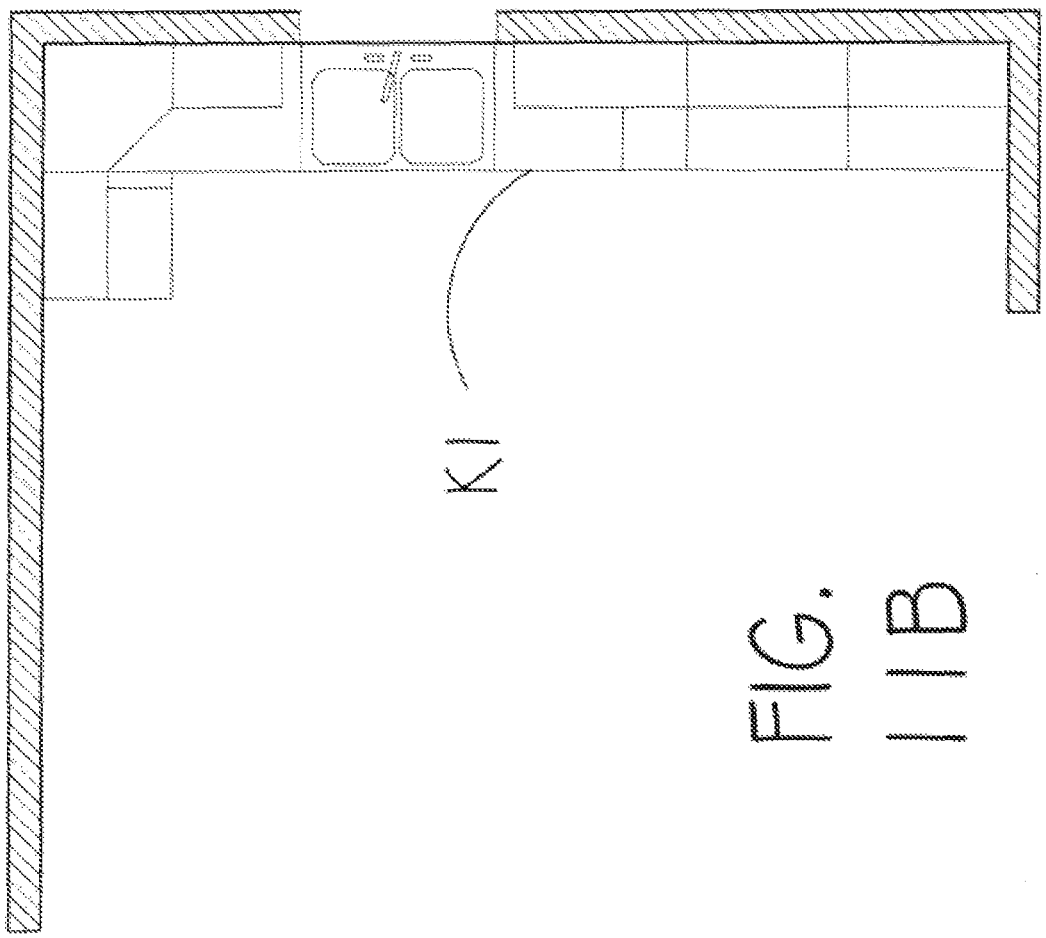
FIG. 11B is an overhead view of the multi-wall kitchen of FIG. 11A.
Figure 12B:
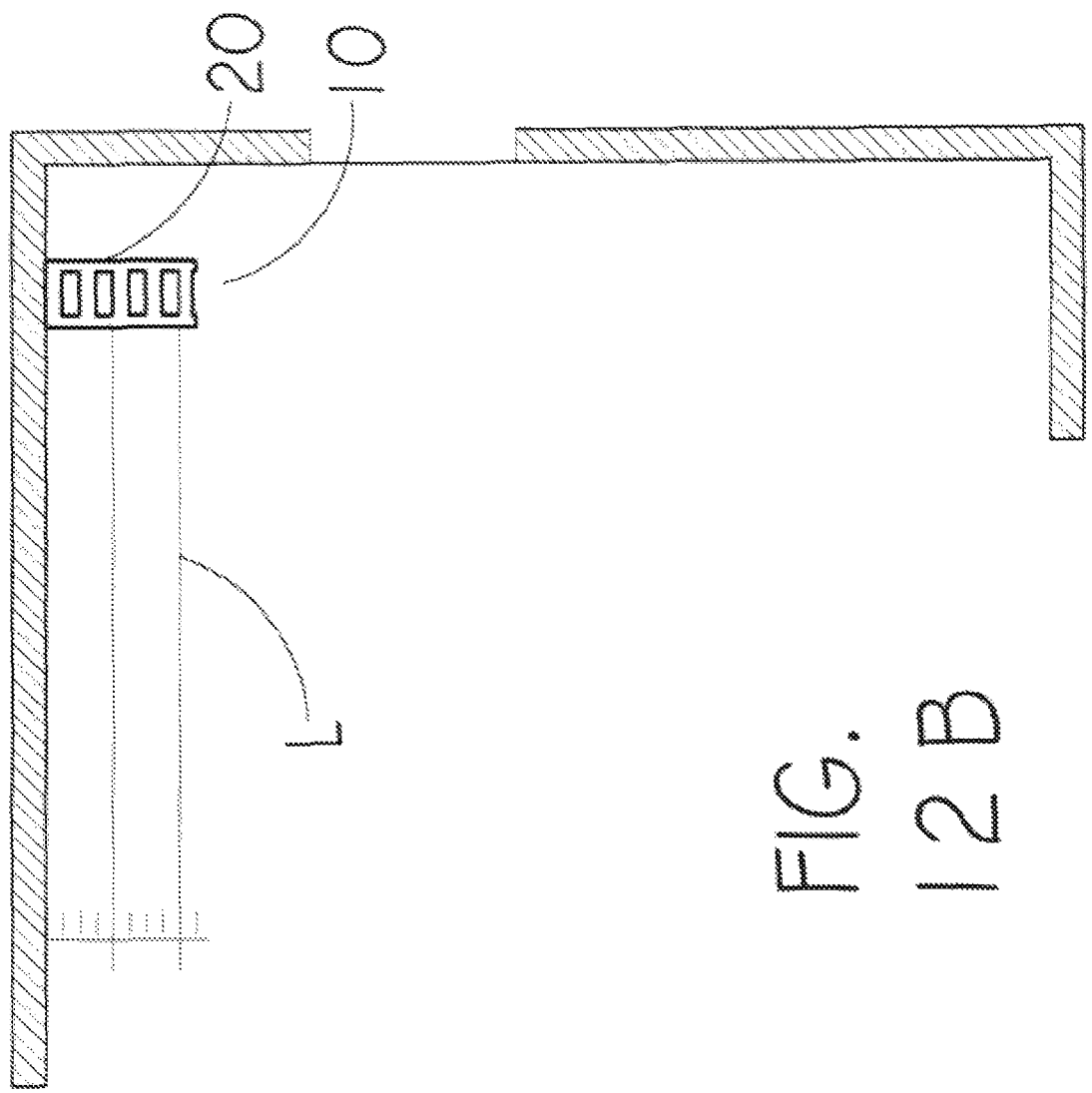
FIG. 12B is an overhead view of another step of the multi-step demonstration of FIG. 12A, proximate a corner.
Figure 10:
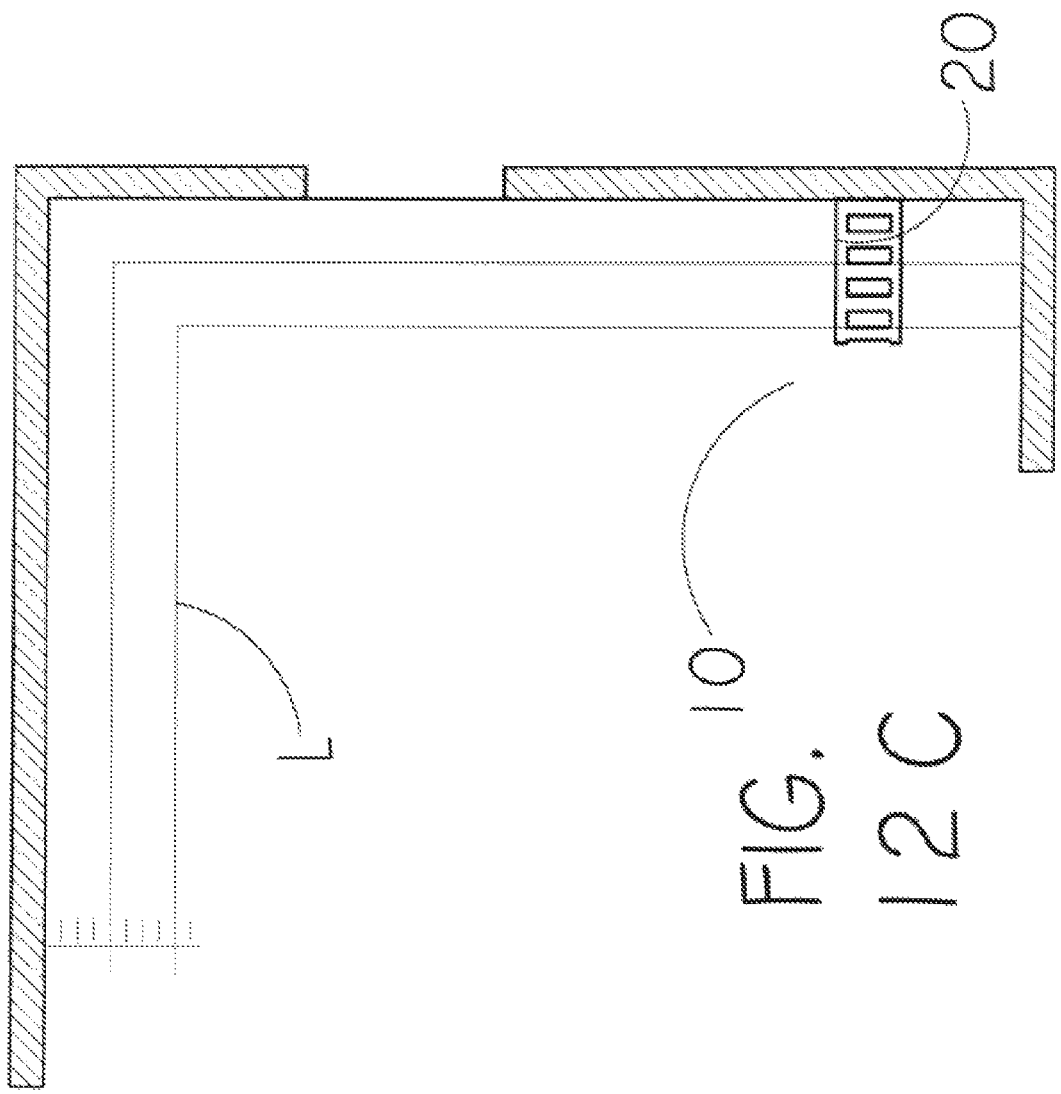
Figure 13:
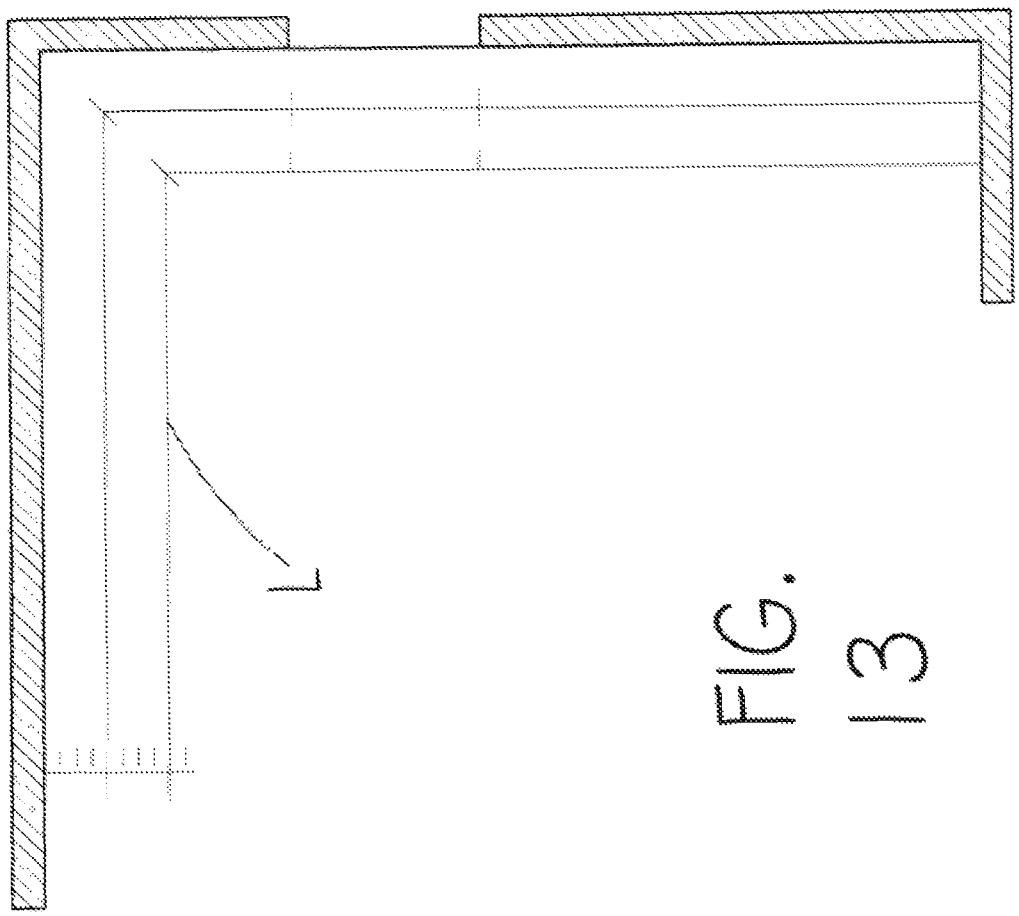
FIG. 13 is an overhead view of walls and bases front edge intersecting points, or markings defined by the cabinet installation tool methods of use demonstrated in FIGS. 12A-12C.

In still another alternate embodiment, with reference now to FIGS. 7-9, expansion arms 110 may be provided in lieu of stand-off element 100. Expansion arms 110 may be removably seated in frame 20, such as shown in FIG. 7, for example, wherein frame 20 could be surface adapted, accordingly, to receive for friction fit. In such manner, expansion arms 110 may be easily transported and ready for use, yet generally flush and unobstrusive during non-use. Mounts 112, representatively shown in FIG. 9, could be similarly adapted into frame 20, for slidable receipt of bases 113, wherein extension 114 of expansion arms 110 could extend over a backsplash to a wall, enabling cabinet installation tool 10 to be utilized proximate an existing backsplash as demonstrably depicted in FIG. 8.

In another embodiment, cabinet installation tool 10 could be formed in more than one piece, wherein assembly to full-size could occur at a job site, with pieces friction fit together, snap-locked, hingedly related, or such, and wherein transport size could thereby be minimized to fit into a small box or bag, for example.

In use, for determination of base cabinet placement, an appropriate short work surface 62, 66 (without or with feet 40b, as appropriate) is placed against the drywall or stud reference proximate a selected position for the end base cabinet edge, and a line L is drawn on the ground surface/foundation marking the end base cabinet edge and front edge. Preferably, tool 10 is repositioned, and the marking is continued, until a line is visible and in position with the desired front edge of the intended cabinets. The defined front edge base cabinet line is measured, and that measurement provides an accurate point of reference for the determination of the layout landscape, or face, of the kitchen cabinet base. This preferred method for base cabinet installation planning is representatively demonstrated in FIGS. 12A-12C for drywall and in FIGS. 14A-14C for stud.

Figure 15:
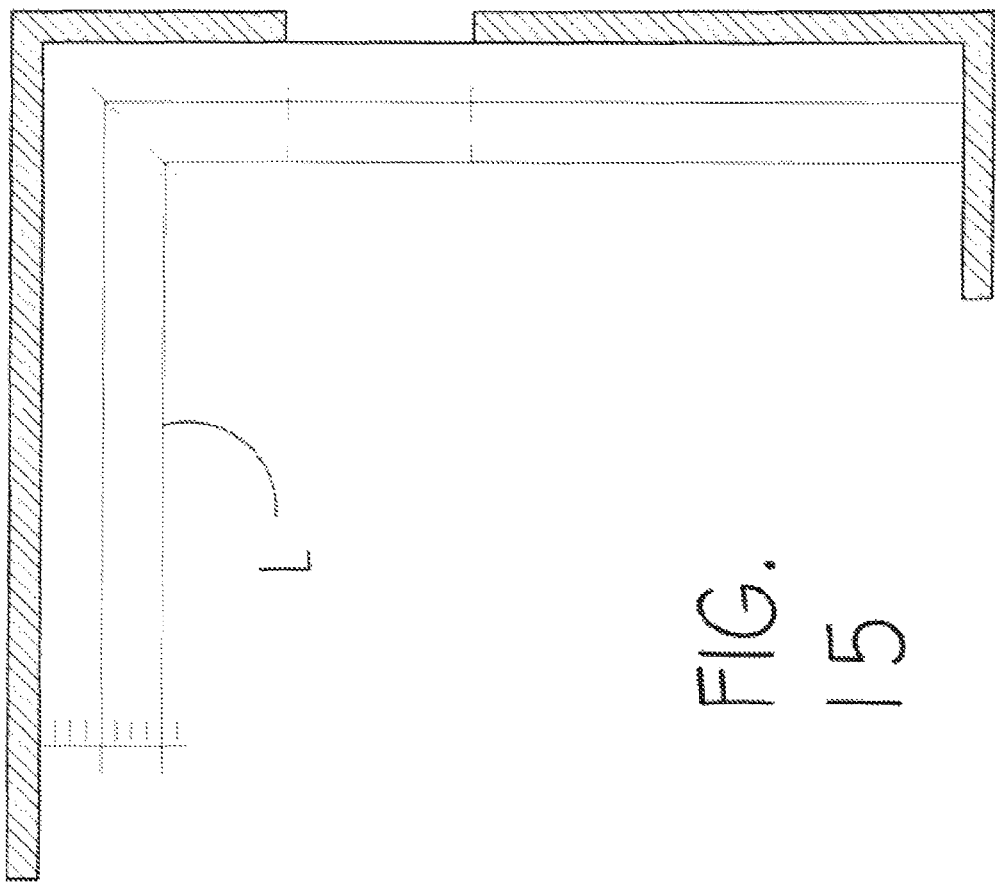
FIG. 15 is an overhead view of walls and bases front edge intersecting points, or markings, defined by the cabinet installation tool methods of use demonstrated in FIGS. 14A-15C.

For determination of wall cabinet placement, the same series of simple and error-free markings is accomplished, from the same placement, but with markings via aperture 82, without or with feet 40a placed against the drywall or stud reference. The defined front edge line for the wall cabinets is created, and measured, with no need for calculations and no risk of negative influence on installation from wall variation-induced measurements, but instead based upon a reproducible and meaningfully visible placement methodology, and conveniently while base cabinets' placement is being marked. This preferred method for wall cabinet installation planning is also representatively demonstrated in FIGS. 12A-12C for drywall and in FIGS. 14A-14C for stud, wherein FIG. 13 and FIG. 15 respectively demonstrate a combined wall and base installation placement lines for drywall and for stud, depicting the front edge intersecting points. Representative depictions of kitchen landscapes K1, K2 and related cabinet overviews that could result from utilization of cabinet installation tool 10, for example, are shown in FIGS. 10A, 10B, 11A, and 11B, wherein front line placement may be observed "in action" relative to actual cabinetry. That is, by placing cabinets according to the front line determined by cabinet installation tool 10, rather than according to a potentially non-plumb wall, the landscape elevation views, such as FIG. 10A and FIG. 11A, can be achieved without interruption or failure of space between cabinets, appliances, and/or walls.

In yet another alternate embodiment, cabinet installation tool 10 could be provided without feet 41, and also solely with measurements inclusive of feet 41. In such embodiments, therefore, a single cabinet installation tool 10 would be useful for either drywall only (without feet 41), or for stud only (incorporating measurements of feet 41).

Finally, according to still another alternate embodiment, cabinet installation tool 10 could be provided with an on-board marking system (not shown), wherein, for example, an engageable marking device could be slidably related to one or more edges.

Having thus described exemplary embodiments of the present invention, it should be noted by those skilled in the art that the within disclosures are exemplary only, and that various other alternatives, adaptations, and modifications may be made within the scope of the present invention.

Accordingly, the present invention is not limited to the specific embodiments illustrated herein, but is limited only by the following claims.

I claim:

1. A template tool for cabinet front edge definition, comprising:
   a rectangular outer frame having an elongate edge and a short edge, wherein said elongate edge of said outer frame has a first length and wherein said short edge of said outer frame has a second length less than said first length; and
   a plurality of expansion arms removably carried by said frame.

2. The template tool of claim 1, further comprising:
   at least one foot extended from an edge of said outer frame.

3. The template tool of claim 2, further comprising at least one aperture defined within a perimeter of said rectangular outer frame.

4. The template tool of claim 3, further comprising a plurality of apertures, wherein each said aperture is rectangularly shaped and is defined perpendicular relative to said elongate edge of said template tool.

5. The template tool of claim 2, wherein said foot extended therefrom is a stud wall cabinet installation tool.

6. The template tool of claim 5, wherein said elongate edge without said foot extended therefrom is a drywall cabinet installation tool, and wherein said short edge without said foot extended therefrom is a drywall installation tool.

7. A cabinet installation tool, comprising:
   a rectangular frame with an elongate length and a short width;
   at least one set of feet carried along said short width, proximate each end of said short width on a first side edge of said frame;
   wherein said short width on said first end edge of said frame is a stud work surface;
   a second end edge of said frame, also of said short width;
   wherein said short width on said second end edge of said frame is a drywall work surface; and
   a stand-off element in communication with said frame.

8. The cabinet installation tool of claim 7, wherein said elongate length is twenty seven and one half inches (27.5 in.).

9. The cabinet installation tool of claim 7, wherein said short width is eight inches (8 in.).

10. The cabinet installation tool of claim 7, wherein each foot of said at least one set of feet is rectangular-shaped, with dimensions of one-half inch (0.5 in.) by one and one-half inch (1.5 in.).

11. The cabinet installation tool of claim 7, further comprising four rectangular apertures defined parallel relative to each other and relative to said short width of said frame.

12. The cabinet installation tool of claim 11, wherein each said aperture is three inches (3 in.) wide and five inches (5 in.) long.

13. The cabinet installation tool of claim 11, wherein a first of said four apertures is defined from three to six inches (3 to 6 in.) from said drywall work surface, wherein a second of said four apertures is defined from nine to twelve inches (9 to 12 in.) from said drywall work surface, wherein a third of said four apertures is defined from fifteen to eighteen inches (15 to 18 in.) from said drywall work surface, wherein a fourth of said four apertures is defined from twenty one to twenty four inches (21 to 24 in.) from said drywall work surface, wherein said fourth of said four apertures is defined from three and one half to six and one half inches (3.5 to 6.5 in.) from said stud work surface, said third of said four apertures is defined from nine and one half to twelve and one half inches (9.5 to 12.5 in.) from said stud work surface, said second of said four apertures is defined from fifteen and one half to eighteen and one half inches (15.5 to 18.5 in.) from said stud work surface, and said first of said four apertures is defined from twenty one and one half to twenty four and one half inches (21.5 to 24.5 in.) from said stud work surface.

14. The cabinet installation tool of claim 7, further comprising frame markings selected from the group consisting of a plurality of measurement tick marks, a reduction to scale chart, at least one third-party advertisement, and a trademark.

15. The cabinet installation tool of claim 7, wherein said frame is comprised of more than one removably or hingedly related component piece.

16. The cabinet installation tool of claim 7, wherein said frame further comprises a marking member for delivering a mark to a surface.

* * * * *